F. W. JOELL.
MOTOR CYCLE AND BICYCLE STAND.
APPLICATION FILED OCT. 23, 1913.

1,179,527.

Patented Apr. 18, 1916.

Witnesses
Chas. E. Kemper.
Frank L. Ratcliffe.

Inventor
F. W. Joell.
By
Attorneys

THE COLUMBIA PLANOGRAPH CO., WASHINGTON, D. C.

UNITED STATES PATENT OFFICE.

FREDERICK W. JOELL, OF HAMILTON, BERMUDA.

MOTOR-CYCLE AND BICYCLE STAND.

1,179,527.  Specification of Letters Patent.  Patented Apr. 18, 1916.

Application filed October 23, 1913. Serial No. 796,929.

*To all whom it may concern:*

Be it known that I, FREDERICK W. JOELL, a subject of the King of England, residing at Hamilton, in the parish of Pembroke, Bermuda Islands, have invented certain new and useful Improvements in Motor-Cycle and Bicycle Stands; and I do hereby declare the following to be a full, clear, and exact description of the invention, such as will enable others skilled in the art to which it appertains to make and use the same.

This invention relates to new and useful improvements in supports for bicycles and motor-cycles.

The object of the invention resides in the provision of a support which, when in operative position will efficiently support the bicycle, and which when moved to inoperative position will be held in such manner as to constitute no obstruction.

A further object is to provide means for holding the support in inoperative position which will prevent rattling of the parts thereof.

A still further object is to increase the efficiency and so simplify the general structure of devices of this character that they may be economically manufactured.

With these and other objects in view, the invention resides in the novel combination, formation and arrangement of parts to be more fully hereinafter described and illustrated in the accompanying drawings and particularly pointed out in the claim hereto appended.

Figure 1:
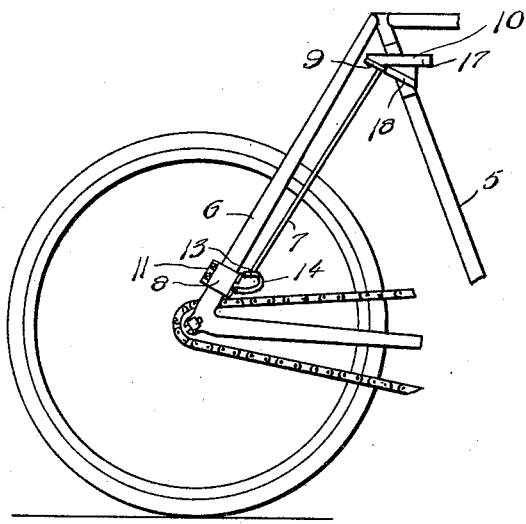
Figure 2:
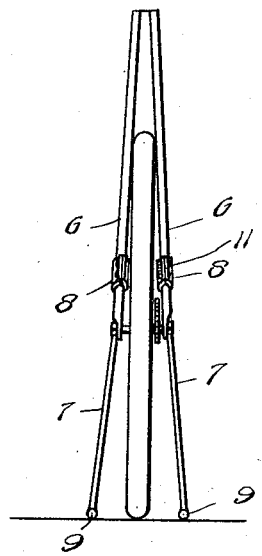
Figure 3:
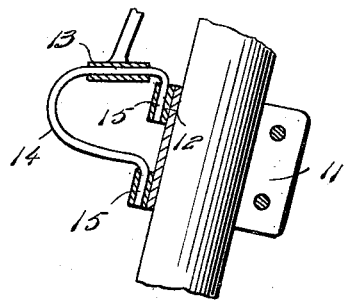
Figure 4:
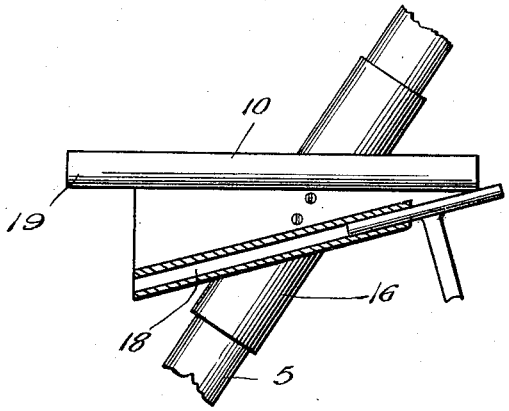

Reference is had to the accompanying drawings wherein similar characters of reference designate corresponding parts throughout the several views, and in which:

Figure 1 is a side elevational view of the rear end of a bicycle with the improved support associated therewith and held in inoperative position, Fig. 2 is a rear end view of the bicycle with the support in operative position, Fig. 3 is a detail view partly in section and partly in elevation showing the means employed for pivotally connecting a supporting rod to the frame of the bicycle, Fig. 4 is a view partly in section and partly in elevation of the device for holding the rods in an operative position.

Referring more particularly to the drawings, wherein is shown the preferred embodiment of the invention, 5 designates the central brace rod of a conventional type of diamond frame bicycle and 6 designates the rear fork bars thereof.

The improved support comprises a pair of rods 7 each of which is pivotally connected to a suitable member 8 carried by the rear fork bar and which have formed at their free ends ground engaging feet 9 which are preferably in the shape of a cross. The upper end of the central brace rod 5 carries suitable members 10 for receiving certain of the arms of the portions 9 to hold the same in inoperative position.

Each of the members 8 comprises a band 11 suitably clamped on a rear fork bar. Carried by the periphery of this band are a pair of vertically extending sleeves 12 spaced apart and having their bores alined. The rod 7 carries at its end a sleeve 13 which is positioned on one of the arms of a U-shaped rod 14 which has its free end portions provided with the lateral extensions 15 seating in the sleeves 12.

From the foregoing it will be observed that a structure is provided which gives full pivotal movement of the rod 7. The lateral extensions of the arms of the U-shaped rods 14 are frictionally held within their corresponding sleeves 12. Should it be desired for any purpose to temporarily remove the supports from the bicycle, it is only necessary to withdraw the extensions from the sleeves.

The member 10 which holds the support in inoperative position comprises a band 16 suitably clamped to the upper end of the central brace rod and carrying on each side of the rod a plate 17, the lower end of which is rolled to provide a bore 18 for receiving one of the fingers of the foot 9. It is observed that this rolled portion is inclined at an angle to the horizontal and has its bore tapered to frictionally hold the finger.

What is claimed is:

In a device of the class described, a clamp adapted to be fastened to the frame of a bicycle, a pair of alining sleeves rigid with and extending from the clamp, a loop-shaped bracket member having offset terminals adapted to seat in and be rigidly held by the sleeves of the clamp, a supporting rod having a sleeve at one end loosely engaging the bracket whereby the rod may be swung on the bracket into and out of supporting position, and means for holding the rod out of supporting position.

In testimony whereof, I affix my signature, in the presence of two witnesses.

F. W. JOELL.

Witnesses:
C. W. McCallan,
W. W. J. Skeen.

Copies of this patent may be obtained for five cents each, by addressing the "Commissioner of Patents, Washington, D. C."